(12) United States Patent
Yabumoto

(10) Patent No.: US 8,985,594 B2
(45) Date of Patent: Mar. 24, 2015

(54) VEHICLE

(75) Inventor: Hirokazu Yabumoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/371,277

(22) PCT Filed: Jan. 11, 2012

(86) PCT No.: PCT/JP2012/050387
§ 371 (c)(1),
(2), (4) Date: Jul. 9, 2014

(87) PCT Pub. No.: WO2013/105229
PCT Pub. Date: Jul. 18, 2013

(65) Prior Publication Data
US 2014/0353934 A1     Dec. 4, 2014

(51) Int. Cl.
*B60G 17/018*     (2006.01)
*B60G 17/0165*    (2006.01)
*B60G 17/00*      (2006.01)
*B60G 17/015*     (2006.01)

(52) U.S. Cl.
CPC ............ *B60G 17/0165* (2013.01); *B60G 17/00* (2013.01); *B60G 17/015* (2013.01); *B60G 17/018* (2013.01)
USPC .......... 280/5.515; 280/124.106; 280/124.158; 701/37

(58) Field of Classification Search
USPC ............. 280/5.515, 124.106, 124.158, 5.513, 280/754; 701/37, 38
See application file for complete search history.

(56) References Cited

U.S. PATENT DOCUMENTS

| | | | | |
|---|---|---|---|---|
| 5,327,983 A | * | 7/1994 | Yoshioka et al. | 180/41 |
| 5,398,184 A | * | 3/1995 | Yamaoka et al. | 701/82 |
| 5,467,280 A | * | 11/1995 | Kimura | 701/37 |
| 5,488,556 A | * | 1/1996 | Sasaki | 701/37 |

(Continued)

FOREIGN PATENT DOCUMENTS

| | | |
|---|---|---|
| JP | 3787038 | 6/2006 |
| JP | 2009-274644 | 11/2009 |

OTHER PUBLICATIONS

International Search Report issued Apr. 17, 2012, in PCT/JP12/050387 filed Jan. 11, 2012.

*Primary Examiner* — Paul N Dickson
*Assistant Examiner* — Darlene P Condra
(74) *Attorney, Agent, or Firm* — Oblon, McClelland, Maier & Neustadt, L.L.P.

(57) ABSTRACT

A spring constant of each of four suspension springs and a shared load on each of four wheels are adjusted so that a sprung resonance frequency corresponding to two front wheels and a sprung resonance frequency corresponding to two rear wheels are mutually different. From among the four shock absorbers, only two shock absorbers provided corresponding to two wheels of lowered sprung resonance frequency, from among the two front wheels and the two rear wheels have respectively damping coefficient modification mechanisms that modify a damping coefficient serving as a reference of the magnitude of the damping force generated by the two shock absorbers. The behavior of the entire vehicle body can be effectively curbed by controlling the damping force exerted on the comparatively large movement of sprung sections corresponding to the two wheels. Thus a vehicle having both enhanced steering stability and enhanced ride quality can be configured comparatively inexpensively.

11 Claims, 9 Drawing Sheets

(56) References Cited

U.S. PATENT DOCUMENTS

| | | | |
|---|---|---|---|
| 5,794,168 A * | 8/1998 | Sasaki et al. | 701/37 |
| 5,810,384 A * | 9/1998 | Iwasaki et al. | 280/5.515 |
| 5,839,082 A * | 11/1998 | Iwasaki | 701/38 |
| 5,944,153 A * | 8/1999 | Ichimaru | 188/299.1 |
| 5,944,763 A * | 8/1999 | Iwasaki | 701/37 |
| 6,148,252 A * | 11/2000 | Iwasaki et al. | 701/37 |
| 6,314,353 B1 | 11/2001 | Ohsaku et al. | |
| 7,822,519 B2 * | 10/2010 | Masamura | 701/37 |
| 2008/0009992 A1 * | 1/2008 | Izawa et al. | 701/37 |
| 2010/0106368 A1 * | 4/2010 | Hidaka et al. | 701/38 |
| 2011/0025001 A1 * | 2/2011 | Kajino | 280/5.515 |
| 2011/0160960 A1 * | 6/2011 | Kajino et al. | 701/38 |
| 2011/0298399 A1 * | 12/2011 | Ogawa et al. | 318/14 |
| 2012/0277953 A1 * | 11/2012 | Savaresi et al. | 701/38 |

* cited by examiner

EXTENSION | RETRACTION

VEHICLE

TECHNICAL FIELD

The invention relates to a vehicle in which only two wheels on one side, from among two wheels on a front side and two wheels on a rear side, are each provided with a shock absorber having a mechanism that modifies a damping coefficient that serves as a reference of a damping force exerted on an approach and separation movement of a sprung section and an unsprung section.

BACKGROUND ART

Suspension systems for vehicles include suspension systems that are provided with shock absorbers, corresponding to respective wheels, each shock absorber having a damping coefficient modification mechanism that modifies a damping coefficient that serves as a reference of a damping force exerted on an approach and separation movement of a sprung section and an unsprung section. For instance, the system disclosed in Patent Document 1 is a suspension system wherein respective hydraulic-type shock absorbers, the damping coefficient of which can be modified by exerting resistance against the circulation of a working fluid accompanying sliding of a piston within a housing, and by modifying the exerted resistance, are provided in each of four wheels. In recent years, suspension systems have been studied in which damping coefficients can be modified through enabling control of a damping force by providing, in respective wheels, electromagnetic-type shock absorbers being devices that, relying on the force generated by an electromagnetic motor, generate a force that is exerted on a sprung section and an unsprung section, in a direction in which the sprung section and the unsprung section move closer to or apart from each other.

Patent Document 1: Japanese Patent Application Publication No. 2009-274644

SUMMARY OF THE INVENTION

Both steering stability and ride quality, which are mutually exclusive, can be enhanced in vehicles equipped with such a suspension system in which shock absorbers having a damping coefficient modification mechanism are provided corresponding to all four wheels. However, the suspension system disclosed in Patent Document 1, i.e. a suspension system wherein hydraulic-type shock absorbers having a damping coefficient modification mechanism are provided corresponding to all four wheels, is comparatively expensive, and it is thus difficult to equip all vehicles with such a system. In the light of the above considerations, it is an object of the invention to provide a vehicle in which both steering stability and ride quality are enhanced in a comparatively inexpensive manner.

In order to attain the above goal, the vehicle is characterized in that a spring constant of each four suspension springs and a shared load on each of four wheels are adjusted such that a sprung resonance frequency corresponding to two front wheels and a sprung resonance frequency corresponding to two rear wheels are different from each other; and from among four shock absorbers, only two shock absorbers that are provided corresponding to two wheels of lowered sprung resonance frequency, from among the two front wheels and the two rear wheels, have respectively damping coefficient modification mechanisms that modify a damping coefficient that serves as a reference of the magnitude of the damping force generated by the two shock absorbers.

A lower sprung resonance frequency translates into a larger movement between the corresponding sprung section and unsprung section. In the vehicle, there are controlled only the shock absorbers corresponding to the two wheels of lower sprung resonance frequency, from among the front wheels and the rear wheels, i.e. the shock absorbers corresponding to the two wheels at which the movement of the sprung section and the unsprung section tends to be large. The behavior of the entire vehicle body can be effectively curbed by controlling the damping force exerted on the comparatively large movement of the sprung sections corresponding to these two wheels. In the vehicle, therefore, it becomes possible to enhance both steering stability and ride quality, which are mutually exclusive, in a comparatively inexpensive manner, since shock absorbers the damping coefficient whereof can be modified are not provided in all wheels.

Various aspects of the invention in the application deemed as claimable (hereafter also referred to as "claimable invention") will be illustrated and explained next. Similarly to the claims, the aspects are set forth divided into numbered sections that may refer to the numbers of other sections, as needed. This is done to make the claimable invention easier to understand, and combinations of the constituent elements that make up the invention are not intended to be limited to the constituent elements set forth in the various sections below. That is, the claimable invention is to be interpreted taking into consideration the disclosure associated to each section, and the disclosure of the embodiments and so forth. So long as that interpretation is adhered to, aspects resulting from further adding other constituent elements to aspects of respective sections, as well as aspects resulting from removing certain constituent elements from aspects of respective sections, may likewise constitute aspects of the claimable invention. Section (1) to section (11) below correspond respectively to claim 1 to claim 11 below.

(1) A vehicle, including:
  four wheels being two front wheels disposed on the front side of the vehicle and two rear wheels disposed on the rear side of the vehicle;
  four suspension springs provided corresponding to the four wheels, each of the suspension springs elastically connecting a sprung section and an unsprung section corresponding to each suspension spring; and
  four shock absorbers provided corresponding to the four wheels, each of the shock absorbers generating a damping force exerted on an approach and separation movement of a sprung section and an unsprung section corresponding to each shock absorber,
  a spring constant of each of the four suspension springs and a shared load on each of the four wheels being adjusted such that a sprung resonance frequency corresponding to the two front wheels and a sprung resonance frequency corresponding to the two rear wheels are different from each other; wherein
  from among the four shock absorbers, only two shock absorbers that are provided corresponding to the two wheels of lowered sprung resonance frequency, from among the two front wheels and the two rear wheels, have respectively damping coefficient modification mechanisms that modify a damping coefficient that serves as a reference of the magnitude of the damping force generated by the two shock absorbers.

As given by the expression below, the sprung resonance frequency ω is determined by a spring constant K of the suspension spring and by the mass m of the sprung section (resulting from dividing the shared load on the vehicle body, supported by the corresponding wheel, by the gravitational acceleration).

$$\omega = (K/m)^{1/2}$$

In the vehicle set forth in this section, accordingly, the shared load on the two front wheels and the spring constant of suspension springs corresponding to the front wheels, as well as the shared load on the two rear wheels and the spring constant of suspension springs corresponding to the rear wheels are each adjusted in such a manner that the sprung resonance frequency corresponding to the two front wheels (hereafter also referred to as "front wheel-side sprung resonance frequency"), and the sprung resonance frequency corresponding to the two rear wheels (hereafter also referred to as "rear wheel-side sprung resonance frequency"), are different from each other. The movement of the vehicle body, for instance after passing over irregularities on the road surface, tends to become more pronounced as the sprung resonance frequency becomes lower.

In the vehicle set forth in this section, the damping coefficient can be modified only in those two shock absorbers corresponding to two wheels of lowered sprung resonance frequency, from among the two front wheels and the two rear wheels. In the vehicle set forth in this section, specifically, there is enabled control of the damping force between the unsprung section and the sprung section of the side of the vehicle body, from among the front side and the rear side, at which the behavior of the vehicle body is more pronounced. The damping force generated by the shock absorbers the damping coefficient whereof can be modified (hereafter also referred to as "variable-damping-coefficient shock absorbers") is not exerted if there is no relative movement between the sprung section and the unsprung section. That is, the behavior of the entire vehicle body can be curbed (controlled) to a greater degree when controlling the damping force (damping coefficient) exerted on the movement between the sprung section and the unsprung section for a large movement of the vehicle body, than when controlling the damping force (damping coefficient) exerted on the movement between the sprung section and the unsprung section for a small movement of the vehicle body. The effect whereby the damping force generated by the shock absorbers curbs the movement of the vehicle body is more pronounced when the movement of the vehicle body is large than when the movement is small. In the vehicle of this section, therefore, only two variable-damping-coefficient shock absorbers are provided. However, the behavior of the entire vehicle body can be effectively subdued through curbing, by way of the two variable-damping-coefficient shock absorbers, of the movement of the sprung section at which the movement of the vehicle body tends to be large. In the vehicle set forth in this section, only two shock absorbers from among the four shock absorbers have a damping coefficient modification mechanism. Accordingly, it becomes possible to enhance both steering stability and ride quality, which are mutually exclusive, in a comparatively inexpensive manner.

The structure and configuration of the "variable-damping-coefficient shock absorber" are not particularly limited. That is, the structure and configuration of the "damping coefficient modification mechanism" set forth in this section are not particularly limited. Although explained in more detail further on, the variable-damping-coefficient shock absorber that is utilized may be, for instance, a hydraulic-type shock absorber the damping coefficient whereof can be modified through modification of the magnitude of the resistance that is exerted against the circulation of a working fluid, or an electromagnetic type shock absorber the damping coefficient whereof can be modified by enabling generation of an arbitrary damping force relying on a force generated by an electromagnetic motor. The variable-damping-coefficient shock absorber may be a shock absorber the damping coefficient whereof can be modified continuously, or a shock absorber the damping coefficient whereof can be modified stepwise over a plurality of set values. Two shock absorbers excluding the above variable-damping-coefficient shock absorbers, from among the above four shock absorbers, are shock absorbers the damping coefficient whereof cannot be modified. From the viewpoint of configuring the vehicle inexpensively, the latter are conventional hydraulic-type shock absorbers that are widely used in ordinary vehicles.

(2) The vehicle according to section (1), wherein
the spring constant of each of the four suspension springs and the shared load on each of the four wheels are adjusted such that the sprung resonance frequency corresponding to the two rear wheels is lower than the sprung resonance frequency corresponding to the two front wheels; and
only the two shock absorbers corresponding to the two rear wheels, from among the four shock absorbers, have the damping coefficient modification mechanisms respectively.

In ordinary vehicles, the rear wheel-side sprung resonance frequency is set to be higher than the front wheel-side sprung resonance frequency, in order to prevent increases in the pitch vibration of the vehicle body and which occur when the vehicle pass over irregularities on the road surface. In the vehicle set forth in this section, by contrast, the rear wheel-side sprung resonance frequency is set to be lower than the front wheel-side sprung resonance frequency. Specifically, the vehicle set forth in this section is configured so that the movement of the rear wheel-side sprung section is comparatively larger, and variable-damping-coefficient shock absorbers are provided corresponding to the rear wheels. Many ordinary vehicles have an engine disposed on the front side. In such vehicles, the weight of the front wheel-side sprung section is little affected by occupants or by cargo load, and does not fluctuate too much. The weight of the rear wheel-side sprung section, by contrast, fluctuates significantly depending on the occupants and cargo load. In the vehicle of this section, the variable-damping-coefficient shock absorbers are provided in the rear wheels; accordingly, the behavior of the vehicle body can be curbed effectively, even upon fluctuation of the weight of the rear wheel-side sprung section, than in a vehicle having a configuration wherein variable-damping-coefficient shock absorbers are provided in the front wheels.

(3) The vehicle according to section (1) or section (2), wherein each of the two shock absorbers having the damping coefficient modification mechanism, from among the four shock absorbers, is a hydraulic-type shock absorber having:
(A) a housing that is connected to one of the sprung section and the unsprung section, and that accommodates a working fluid; (B) a piston that divides the interior of the housing into two working fluid chambers, and that can slide through the interior of the housing; (C) a piston rod that has one end section connected to the piston and the other end section extending out of the housing and being connected to the other one of the sprung section and the unsprung section; (D) a working fluid circulation allowing mechanism that is provided in the piston, and that allows circulation of the working fluid between the two working fluid chambers, resulting from sliding of the piston, in a state of exerting resistance against the circulation; and (E) a flow resistance modification mechanism that functions as the damping coefficient modification mechanism, by being configured to modify the damping coefficient through modification of the magnitude of the resistance that the working fluid circulation allowing mechanism exerts against the circulation of the working fluid.

(4) The vehicle according to section (1) or section (2), wherein each of the two shock absorbers having the damping coefficient modification mechanism, from among the four shock absorbers, is an electromagnetic-type shock absorber that has an electromagnetic motor and that generates an approach and separation force, which is a force that relies on a force generated by the electromagnetic motor and that is exerted, on the sprung section and the unsprung section corresponding to the shock absorber, to draw the sprung section and the unsprung section closer to or apart from each other; and the vehicle has the damping coefficient modification mechanism by being configured such that upon generation of the approach and separation force as the damping force, the damping force is determined by the product of a speed of the approach and separation movement of the sprung section and the unsprung section, and a gain corresponding thereto, and by being configured such that the gain can be modified.

The aspect set forth in the above two sections is embodied as a variable-damping-coefficient shock absorber.

(5) The vehicle according to section (3) or section (4), wherein each of the two shock absorbers, excluding the two shock absorbers having the damping coefficient modification mechanism, from among the four shock absorbers, is a hydraulic-type shock absorber in which the damping coefficient cannot be modified.

In the aspect set forth in this section, so-called conventional hydraulic-type shock absorbers are used as the two shock absorbers the damping coefficient whereof cannot be modified. That is, shock absorbers of various structures and configurations, and which are used in ordinary vehicles, can be utilized herein.

(6) The vehicle according to any one of section (1) to section (5), wherein the vehicle includes a control device that controls the damping coefficient modification mechanism of each of two shock absorbers from among the four shock absorbers; and the control device divides vibration generated in a vehicle body into a heave vibration component, a roll vibration component and a pitch vibration component, each of which is one component of the vibration, determines a target damping force, which is a damping force to be generated by each of the four shock absorbers, in accordance with a control rule such that each of the vibration components is damped by the four shock absorbers concertedly, and controls the damping coefficient modification mechanism of each of the two shock absorbers, from among the four shock absorbers, so as to perform modification to a damping coefficient according to the corresponding target damping force.

The aspect set forth in this section is embodied in the form of a control scheme of a damping coefficient modification mechanism. A control scheme used in a vehicle that is provided with four variable-damping-coefficient shock absorbers corresponding to each of the four wheels is used, as-is, in the vehicle of the aspect in this section. The vehicle is configured in such a manner that the movement of the sprung section corresponding to the variable-damping-coefficient shock absorbers is larger, and the movement of the sprung section corresponding to the shock absorbers the damping coefficient whereof cannot be modified is smaller. The behavior of the vehicle body can be sufficiently curbed even when using, as-is, a control scheme that is constructed conventionally, such as the above one. The aspect in this section, therefore, allows configuring the vehicle easily, since no vehicle-dedicated control scheme need be constructed in such an instance.

The vibration of the vehicle body can be regarded as the resultant of a heave vibration component, being vibration of the center of gravity of the vehicle body in a top-bottom direction, a roll vibration component, being rotational vibration about the axis of a front-rear direction that passes through the center of gravity of the vehicle body, and a pitch vibration component, being rotational vibration about the axis of a left-right direction that passes through the center of gravity of the vehicle body. As the "control rule" set forth in this section there can be used, for instance, a rule that involves determining the components of the force, necessary for the entire vehicle body, for damping each of the heave vibration component, the roll vibration component and the pitch vibration component, distributing then each of the components to the four shock absorbers, and summing the components for each shock absorber, to determine thereby the respective target damping force for each of the four shock absorbers. As explained in detail below, for instance, a feedback control system can be constructed in which the heave acceleration, the roll acceleration and the pitch acceleration are used as a control output, and a control rule can be adopted according to which the target damping forces are determined in such a manner that the foregoing accelerations are curbed.

(7) The vehicle according to section (6), wherein the control device is configured to determine, as the control rule, the target damping force in use of state feedback control having, as a control output, a heave acceleration which is an acceleration of the vehicle body in a top-bottom direction, a roll acceleration which is an angular acceleration of the vehicle body about the axis of a front-rear direction, and a pitch acceleration which is an angular acceleration of the vehicle body about the axis of a left-right direction, so as to curb the heave acceleration, the roll acceleration and the pitch acceleration.

The control rule for determining target damping forces is limited in the aspect set forth in this section. For instance, a plant (control model) in which non-linear parts of the damping coefficients of the shock absorbers are selected as the control input, and heave acceleration, roll acceleration and pitch acceleration are selected as the control output, may be postulated as the control rule set forth in this section. A control system can then be used that is designed for that plant. This control system can be constructed in accordance with H∞ control theory wherein the impact of plant uncertainty is curtailed by treating the uncertain portions of the control object as disturbance signals. Herein, H∞ control theory is design means for reducing the norm of a transfer function, from disturbance input to evaluation output (norm for evaluating a transfer function), with the above plant as the target, by imparting appropriate feedback from the control output to the control input.

(8) The vehicle according to section (7), wherein the control rule conforms to non-linear H∞ control theory.

The aspect set forth in this section affords a vehicle having superior damping performance and in which the target damping force can be controlled continuously, even using hydraulic-type shock absorbers that cannot generate a propulsive force, since the target damping force is determined within a range of forces that can be generated by the hydraulic-type shock absorbers. The aspect in this section, as explained above, is suitable for hydraulic-type shock absorbers the damping coefficient whereof can be modified through modification of the magnitude of the resistance exerted against the circulation of a working fluid.

(9) The vehicle according to section (7) or section (8), wherein the control rule according to which the state feedback control is performed is established on the basis of state equations that are derived on the basis of an equation of motion of the vehicle body in the top-bottom direction, an equation of motion of the vehicle body about the axis of the front-rear direction, and an equation of motion of the vehicle body about the axis of the left-right direction.

The aspect set forth in this section is embodied as a method for defining a plant in which heave acceleration, roll acceleration and pitch acceleration are the control output.

(10) The vehicle according to any one of section (7) to section (9), wherein the control device is configured to use, as state quantities in the state feedback control, (a) a sprung acceleration which is an acceleration of the sprung section in the top-bottom direction, (b) a sprung speed which is a speed of the sprung section in the top-bottom direction, (c) a relative displacement amount between the sprung section and the unsprung section in an approach and separation direction, and (d) a relative speed between the sprung section and the unsprung section in the approach and separation direction, corresponding to each of the four wheels.

The input values used to control the variable-damping-coefficient shock absorbers are limited in the aspect set forth in this section. That is, the indicators required for determining the target damping force are limited. In the aspect of this section, the sprung acceleration can be detected by a sensor that detects a vertical acceleration, being the acceleration of the sprung section in the top-bottom direction; the sprung speed can be acquired by integrating the detection result. The relative displacement amount can be detected by a sensor that detects the distance between the sprung section and the unsprung section in the direction of drawing closer or apart from each other; the relative speed can be acquired by integrating the detection result.

(11) The vehicle according to section (10), wherein the vehicle has three vertical acceleration sensors including two sensors that detect a sprung vertical acceleration, which is an acceleration of the sprung section in the top-bottom direction, corresponding to each of the two front wheels, and a sensor that detects the acceleration, in the top-bottom direction, of a portion of the vehicle body positioned between the two rear wheels; and the control device is configured to calculate the sprung acceleration and sprung speed corresponding to each of the two rear wheels on the basis of the detection results by the three vertical acceleration sensors.

The movement of a plane, i.e. the movement of the vehicle body can be estimated given the detection results of the three vertical acceleration sensors. The aspect set forth in this section involves a configuration wherein the sprung vertical acceleration and the sprung speed for the two rear wheels are estimated by relying on this feature. The sprung acceleration of the sprung sections corresponding to each of the two front wheels can be acquired by integrating the detection results of the sensors that detect sprung vertical acceleration and that are provided corresponding to each of the two front wheels.

MODES FOR CARRYING OUT THE INVENTION

An explanation follows next, with reference to accompanying drawings, on various embodiments as modes for carrying out the claimable invention. Other than the embodiments below, the claimable invention can be carried out also in the form of various aspects, such as the aspects described in the previous paragraphs, and aspects arrived at through various modifications and alterations on the basis of the knowledge possessed by a person skilled in the art. Variations of the embodiments below can likewise be arrived at by resorting to the technical features set forth in the explanation in previous paragraphs.

Embodiment 1

Configuration of the Vehicle

Figure 1:
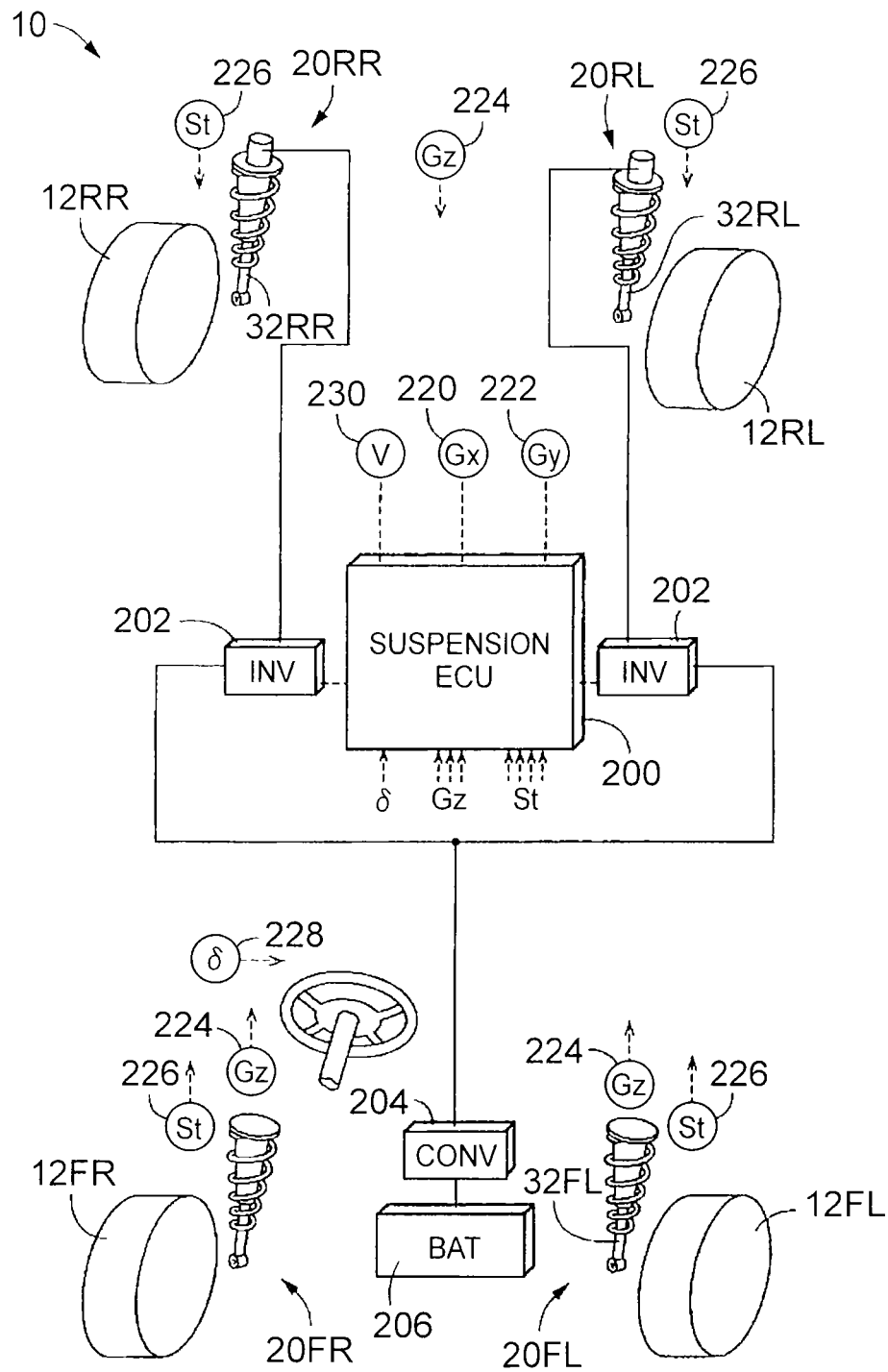
FIG. 1 is a schematic diagram illustrating the overall configuration of a vehicle being a first embodiment of the claimable invention.

FIG. 1 illustrates schematically a vehicle 10 being an embodiment of the claimable invention. A suspension system is installed in the vehicle 10. The suspension system is made up of four suspension devices 20, of independent suspension type, corresponding respectively to four wheels 12 that are disposed at four corners of the vehicle 10. Each suspension device 20 is provided between a suspension lower arm 22 that holds a wheel 12 and that makes up part of an unsprung section, and a mount section 24 that is provided in a vehicle body and that makes up part of a sprung section, such that the suspension lower arm 22 and the mount section 24 are connected by the suspension device 20. Herein, the wheels 12 and the suspension devices 20 are generic terms. In those instances where it is necessary to clarify which one from among the four wheels a given wheel 12 or a given suspension device 20 corresponds to, a suffix FL, FR, RL or RR corresponding respectively to left front wheel, right front wheel, left rear wheel and right rear wheel will be added the relevant wheel or suspension device, as illustrated in the figures. When it is necessary to distinguish between the front wheel side and rear wheel side, the suffixes Fr and Rr will be used.

Each suspension device 20 has a coil spring 30, as a suspension spring, and a hydraulic-type shock absorber 32. The coil spring 30 and the hydraulic-type shock absorber 32 are disposed, parallelly to each other, between the lower arm 22 and the mount section 24. As explained in detail further on, two shock absorbers 32Fr corresponding to the front wheels 12FR, 12FL are conventional shock absorbers, i.e. are shock absorbers the damping coefficient whereof cannot be modified, whereas two shock absorbers 32Rr corresponding to the rear wheels 12RR, 12RL are shock absorber configured such that the damping coefficient thereof can be modified. The structure of the shock absorbers will be explained in detail below in the order shock absorbers 32Fr corresponding to the front wheels 12Fr (hereafter also referred to as "front wheel-side shock absorbers 32Fr" in the explanation below), and shock absorbers 32Rr corresponding to the rear wheels 12Rr (hereafter also referred to as "rear wheel-side shock absorbers 32Rr" in the explanation below).

Figure 2:
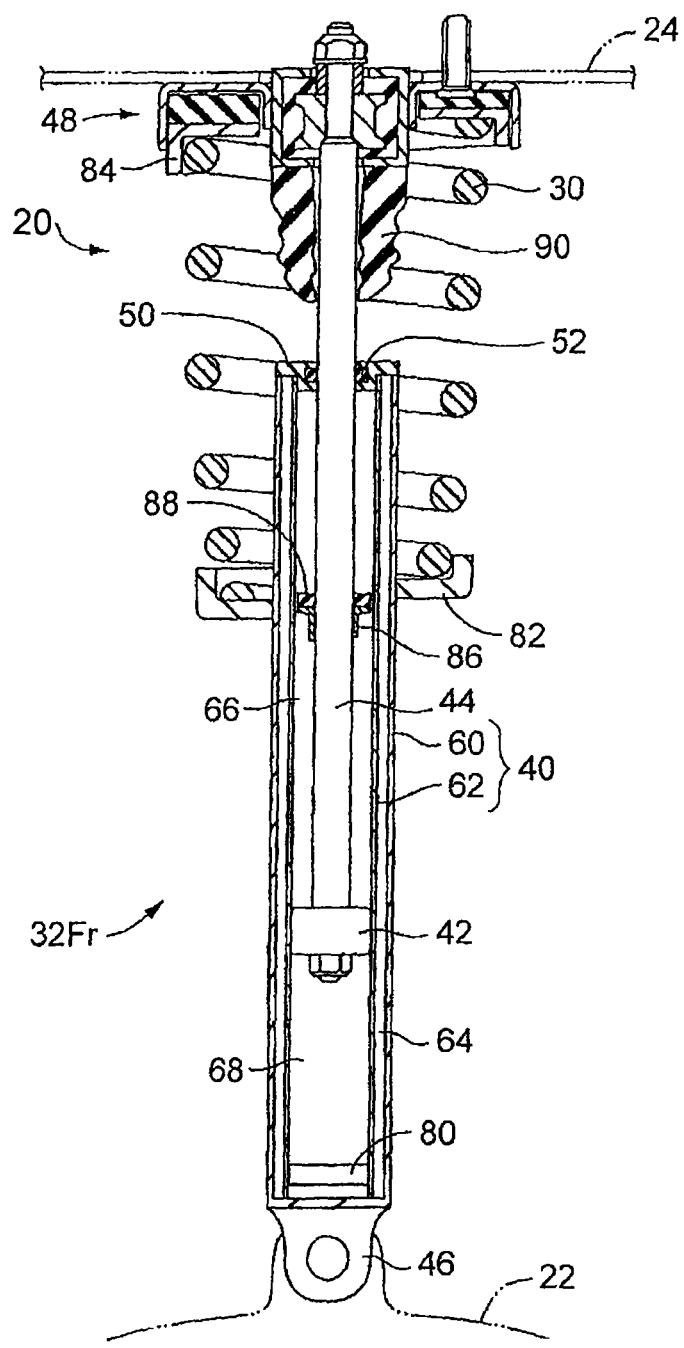
FIG. 2 is a front-view cross-sectional diagram illustrating a suspension device corresponding to the front wheels depicted in FIG. 1.

The structure of the front wheel-side shock absorbers 32Fr will be explained in detail next with reference to FIG. 2 and FIG. 3. As illustrated in FIG. 2, each of the front wheel-side shock absorbers 32Fr is configured by including a housing 40 that accommodates a working fluid, a piston 42 that is fitted slidably and in a liquid-tight manner into the housing 40, and a piston rod 44 such that lower end section thereof is connected to the piston 42 and the upper end section extends upwards out of the housing 40. The housing 40 is connected to the lower arm 22 via a bush 46 that is provided in the lower end section of the housing 40, and the piston rod 44 is connected to the mount section 24 via an upper support 48 having a vibration-proof rubber. The piston rod 44 runs through a lid section 50 that is provided at the top of the housing 40, and is in sliding contact with the lid section 50 via a seal 52.

Figure 3:
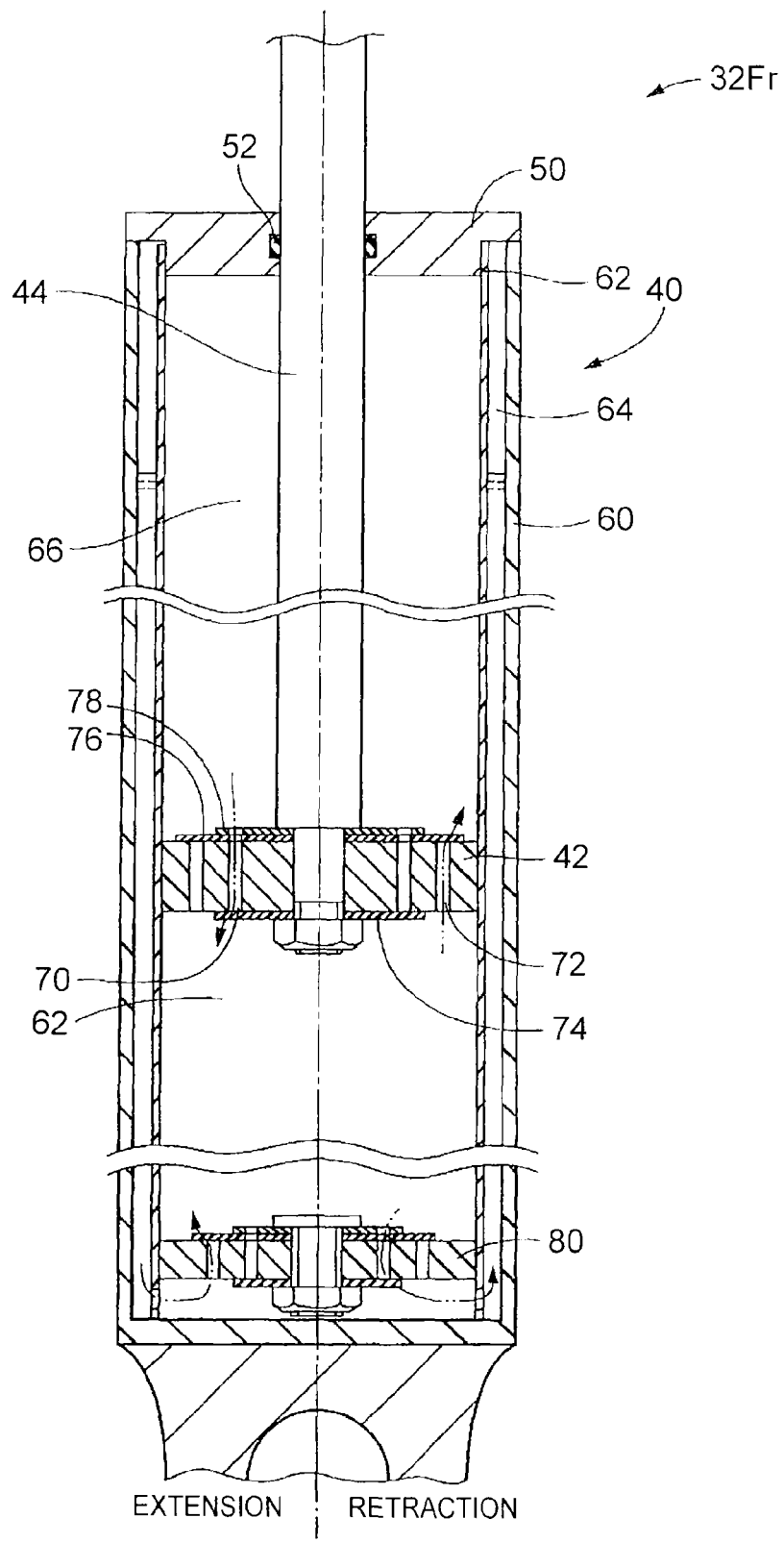
FIG. 3 is a front-view cross-sectional diagram illustrating an enlargement of a shock absorber depicted in FIG. 2.

As illustrated in FIG. 3, the housing 40 is configured by including an outer cylinder 60 and an inner cylinder 62, with a buffer chamber 64 being formed between the outer cylinder 60 and the inner cylinder 62. The piston 42 fits into the inner side of the inner cylinder 62, and divides the interior of the inner cylinder 62 into an upper chamber 66 and a lower chamber 68. Connecting passages 70, 72 that connect the upper chamber 66 and the lower chamber 68 are provided concentrically, in the piston 42, at a plurality of respective sites (two sites each in the depiction of FIG. 3). A circular valve plate 74 made of an elastic material is disposed at the lower face of the piston 42. The connecting passages 70 on the inner peripheral side of the piston 42 are plugged by the valve plate 74, such that a working fluid is allowed to flow from the upper chamber 66 to the lower chamber 68 when the valve plate 74 is flexed on account of the hydraulic pressure difference between the upper chamber 66 and the lower chamber 68. Two circular valve plates 76, 78 made of an elastic material are disposed at the top face of the piston 42. The connecting passages 72 on the outer peripheral side of the piston 42 are plugged by the valve plates 76, 78, with the connecting passages 70 on the inner peripheral side of the piston 42 being normally not plugged, thanks to the openings provided in the valve plates 76, 78. The working fluid is allowed to flow from the lower chamber 68 to the upper chamber 66 when the valve plate 76 is flexed on account of the hydraulic pressure difference between the upper chamber 66 and the lower chamber 68. A base valve body 80, having connecting passages and valve plates similar to those the piston 42, is provided between the lower chamber 68 and the buffer chamber 64.

A ring-like lower retainer 82 is provided in the outer peripheral section of the housing 40. A ring-like upper retainer 84 is provided on the lower face side of the mount section 24, via a vibration-proof rubber. The coil spring 30 is supported by the lower retainer 82 and the upper retainer 84, in a state where the coil spring 30 is pinched by the lower retainer 82 and the upper retainer 84. A ring-like member 86 is fixedly provided on the outer peripheral section of the piston rod 44, at the portion of the latter that is accommodated in the upper chamber 66. A ring-like shock-absorbing rubber 88 is bonded to the top face of the ring-like member 86. A cylindrical shock-absorbing rubber 90 is bonded to the upper end section of the piston rod 44. The lower face of the lid section 50 of the housing 40 abuts the shock-absorbing rubber 88 when the vehicle body and the wheel move relatively by a given extent in the direction of drawing apart from each other (hereafter also referred to as "rebound direction"); conversely, the top face of the lid section 50 abuts the shock-absorbing rubber 90 when the vehicle body and the wheel move relatively by a given extent in the direction of drawing near to each other (hereafter also referred to as "bound direction"). The front wheel-side shock absorbers 32Fr have thus stoppers, so-called bound stopper and rebound stopper, for the approach and separation of the vehicle body and the wheels to/from each other.

By virtue of such a structure, for instance, fluid pressure in the upper chamber 66 increases if the lower arm 22 and the mount section 24 draw apart from each other and the piston 42 moves upward with respect to the housing 40. As a result, part of the working fluid in the upper chamber 66 flows to the lower chamber 68, through the connecting passages 70, and part of the working fluid in the buffer chamber 64 flows into the lower chamber 68, through the connecting passages of the base valve body 80. Conversely, the fluid pressure in the lower chamber 68 increases when the lower arm 22 and the mount section 24 draw close to each other and the piston 42 moves downward with respect to the housing 40. As a result, part of the working fluid in the lower chamber 68 flows to the upper chamber 66 through the connecting passages 72, and flows out into the buffer chamber 64 through the connecting passages of the base valve body 80. A resistance force is exerted against the circulation of the working fluid in these instances, and a resistance force is exerted thus against the relative motion of the piston 42 and the housing 40. That is, the front wheel-side shock absorbers 32Fr are structured so as to generate a damping force against the approach and separation movement of the sprung section and the unsprung section. The damping coefficient of the front wheel-side shock absorbers 32Fr takes on a value, i.e. a fixed value, corresponding to the cross-sectional area of the passage through which the working fluid passes once the speed of the approach and separation movement of the sprung section and the unsprung section becomes greater than a given speed.

Figure 4:
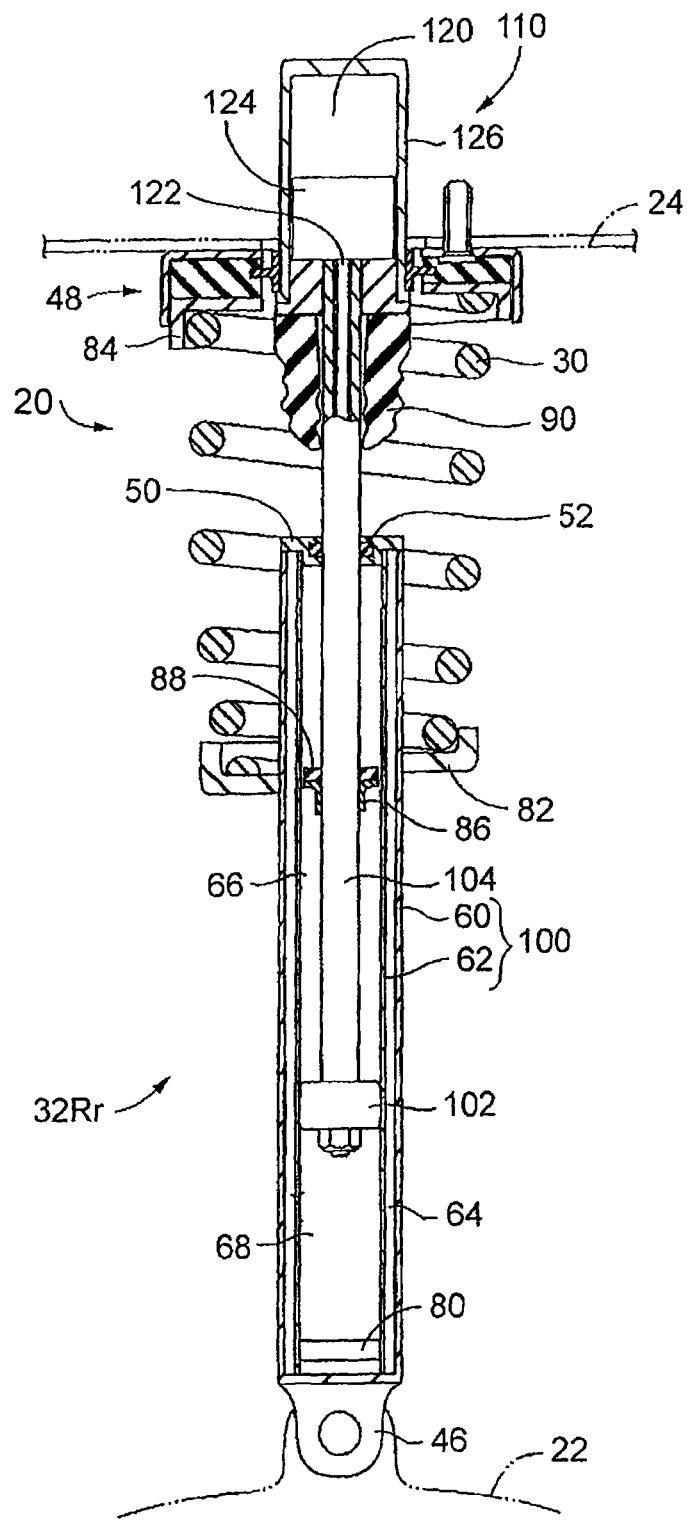
FIG. 4 is a front-view cross-sectional diagram illustrating a suspension device corresponding to the rear wheels depicted in FIG. 1.

The structure of the shock absorbers 32Rr corresponding to the rear wheels 12Rr will be explained next in detail with reference to FIG. 4 and FIG. 5. Similarly to the front wheel-side shock absorbers 32Fr, the rear wheel-side shock absorbers 32Rr are hydraulic-type shock absorbers. Constituent elements identical to those of the front wheel-side shock absorbers 32Fr will be identified as corresponding elements through the use of identical reference symbols, and an explanation of the elements will be omitted or simplified.

As in the case of the front wheel-side shock absorbers 32Fr, the rear wheel-side shock absorbers 32Rr are configured by including a housing 100, a piston 102 and a piston rod 104. The rear wheel-side shock absorbers 32Rr are structured such that a resistance force is exerted against the relative motion of the housing 100 and the piston 102, i.e. is structured such that a damping force is generated against the approach and separation movement of the sprung section and the unsprung section.

As indicated above, the rear wheel-side shock absorbers 32Rr each have a damping coefficient modification mechanism 110. The damping coefficient modification mechanism 110 is configured by including a rotary-type electromagnetic motor 120 (hereafter also referred simply to as "motor 120"), an adjusting rod 122 that can move in the axial direction, and a movement conversion mechanism 124 that converts the rotational movement of the motor 120 into movement in the axial direction of the adjusting rod 122. The motor 120 is housed in a motor case 126 that is connected to the mount section 24 by way of an upper support 128 configured by including a vibration-proof rubber, at the outer peripheral section of the motor case 126. The piston rod 104 is fixed to the motor case 126 at the upper end section of the piston rod 104. As a result, the piston rod 104 is connected to the mount section 24 by way of the motor case 126. A through-hole 130 extending in the axial direction is formed in the piston rod 104. The adjusting rod 122 is inserted through the through-hole 130 in such a way so as to be capable of moving in the axial direction. The adjusting rod 122 is connected to the motor 120 by way of the movement conversion mechanism 124, at the upper end section of the adjusting rod 122, such that the latter is caused to move in the axial direction in response to the rotational driving of the motor 120.

Figure 5:
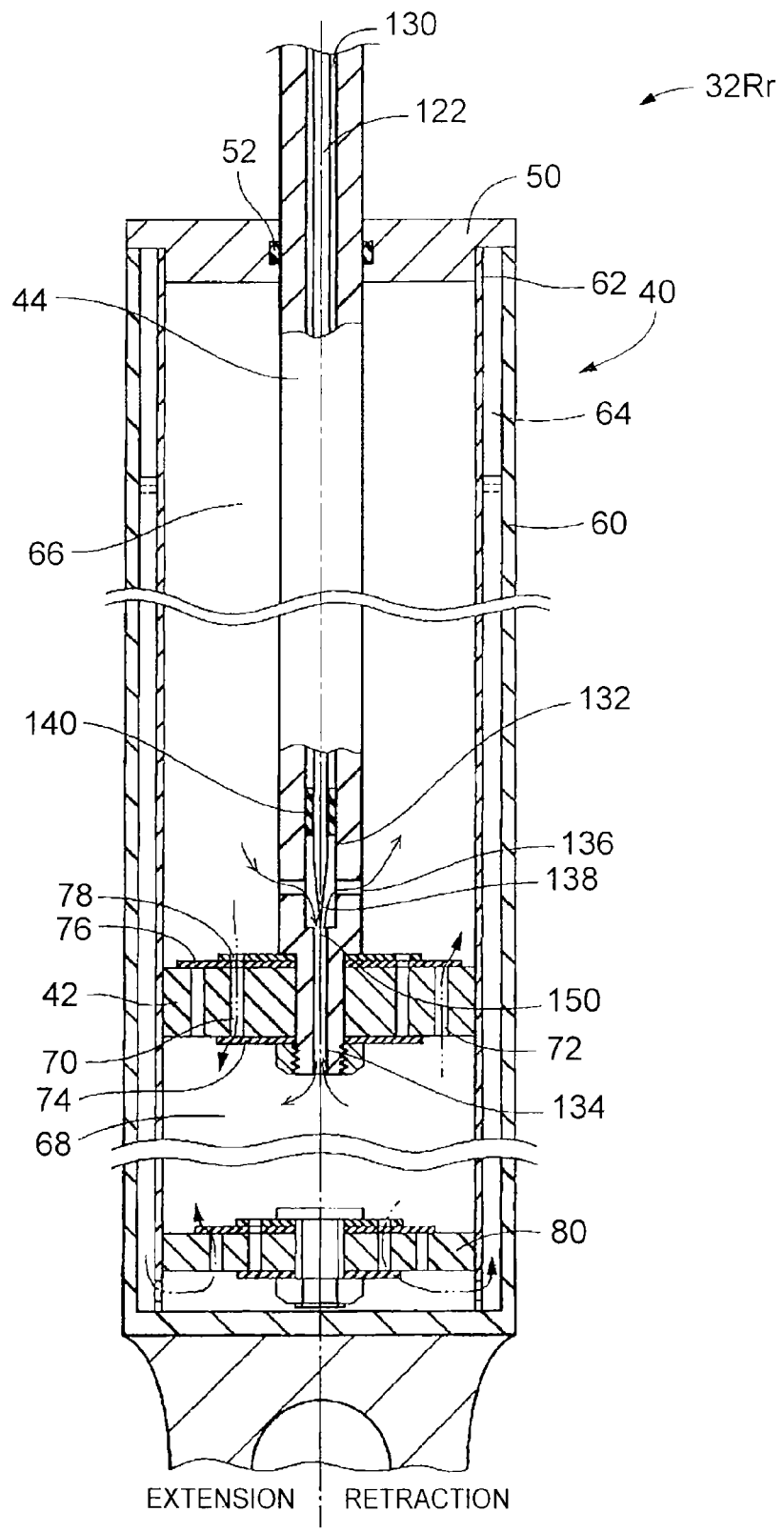
FIG. 5 is a front-view cross-sectional diagram illustrating an enlargement of a shock absorber depicted in FIG. 4.

As illustrated in FIG. 5, the through-hole 130 of the piston rod 104 has a stepped shape where the upper portion constitutes a large-diameter section 132 and the lower portion constitutes a small-diameter section 134. The large-diameter section 132 is opened to upper chamber 66 by way of connecting passages 136, and the small-diameter section 134 is opened to the lower chamber 68. The upper chamber 66 and the lower chamber 68 communicate thus with each other. Except at the portion of a lower end section 138, the outer diameter of the adjusting rod 122 is smaller than the inner diameter the large-diameter section 132, and larger than the inner diameter of the small-diameter section 134. The lower end section 138 of the adjusting rod 122 is shaped as a cone the outer diameter whereof decreases downwards, so as to be capable of entering into the small-diameter section 134. A seal 140 is provided, upward of the portion at which the connecting passages 136 of the through-hole 130 are connected, to secure the liquid-tightness between the inner peripheral face of the through-hole 130 and the outer peripheral face of the adjusting rod 122.

The adjusting rod 122 can move in the axial direction as a result of the movement of the motor 120. The adjusting rod 122 can modify the size (cross-sectional area) of a clearance 150 of the through-hole 130. When working fluid flows through the clearance 150, a resistance force is exerted against the movement of the piston 102 in the top-bottom direction, as described above. The magnitude of this resistance force varies depending on the size of the clearance 150. Accordingly, the rear wheel-side shock absorbers 32Rr have a structure wherein the adjusting rod 122 is caused to move in the axial direction, through the movement of the motor 120, to modify thereby the clearance 150; as a result, it becomes possible to modify the damping characteristic on the approach and separation movement of the sprung section and the unsprung section, i.e. to modify the damping coefficient. In more detailed terms, the rear wheel-side shock absorbers 32Rr have a structure wherein the motor 120 is controlled in such a manner that the rotation angle thereof becomes a rotation angle corresponding to the damping coefficient that the rear wheel-side shock absorbers 32Rr should have, and the damping coefficient of the rear wheel-side shock absorbers 32Rr is thus modified.

The vehicle 10 is configured in such a manner that a sprung resonance frequency $\omega_{Fr}$ corresponding to the front wheels Fr and a sprung resonance frequency $\omega_{Rr}$ corresponding to the rear wheels Rr are different from each other. Specifically, the sprung resonance frequency $\omega_{Rr}$ corresponding to the rear wheels, in which the corresponding shock absorbers 32 have the damping coefficient modification mechanism 110, is set lower than the front wheel-side sprung resonance frequency $\omega_{Fr}$. As given by the expression below, the sprung resonance frequency w is determined by a spring constant K of the suspension spring 30 and by the mass m of the sprung section (resulting from dividing a shared load W of the vehicle body, supported by the corresponding wheel, by the gravitational acceleration g).

$$\omega = (K/m)^{1/2}$$

In the vehicle 10, accordingly, the shared load on the front wheels Fr and a spring constant $K_{Fr}$ of coil springs 30Fr of the front wheel-side suspension devices 20, as well as the shared load on the rear wheels Rr and a spring constant $K_{Rr}$ of the coil springs 30Rr of the rear wheel-side suspension devices 20 are adjusted in such a manner that the rear wheel-side sprung resonance frequency $\omega_{Rr}$ is lower than the front wheel-side sprung resonance frequency $\omega_{Fr}$. Specifically, the spring constant $K_{Fr}$ of each front wheel-side spring 30Fr is established in such a manner that the front wheel-side sprung resonance frequency $\omega_{Fr}$ is 1.2 Hz, on the basis of the shared load on the front wheels Fr as determined by be designed vehicle body, and the spring constant $K_{Rr}$ of each rear wheel-side spring 30Rr is established in such a manner that the rear wheel-side sprung resonance frequency $\omega_{Rr}$ is 1.0 Hz, on the basis of the shared load on the rear wheels Rr.

In a suspension system installed in the vehicle 10, the damping coefficient modification mechanism 110 in each of the rear wheel-side shock absorbers 32Rr is controlled by a suspension ECU 200 as a control device. The ECU 200 is configured by having, as a main constituent, a computer that is provided with a central processing unit (CPU), a read only memory (ROM), a random access memory (RAM) and so forth. The ECU 200 has connected thereto two inverters [INV] 202 that are provided corresponding to respective motors 120 of the rear wheel-side shock absorbers 32Rr, and that function as respective drive circuits of the corresponding motors 120. The inverters 202 are connected to a battery [BAT] 206 via a converter [CONV] 204. Power is supplied to the motors 120 of the shock absorbers 32Rr by a power source that is configured by including the converter 204 and the battery 206.

The vehicle 10 is provided with, for instance: a front-rear acceleration sensor [Gx] 220 that detects a front-rear acceleration generated in the vehicle body; a lateral acceleration sensor [Gy] 222 that detects lateral acceleration generated in the vehicle body; three vertical acceleration sensors [Gz] 224 that detect a vertical acceleration (top-bottom acceleration) of each mount section 24 of the vehicle body corresponding to the right front wheel 12FR and the left front wheel 12FL, and of a portion of the vehicle body positioned centrally between the two rear wheels 12Rr; four stroke sensors [St] 226 that detect the distance (hereafter also referred to as "stroke", since the distance is the amount of extension and retraction of the shock absorbers 32) between the sprung section and the unsprung section at each wheel 12; a steering angle sensor [δ] 228 that detects the steering angle of a steering wheel; and a vehicle speed sensor [v] 230 that detects a vehicle travel speed (hereafter also referred to as "vehicle speed" for short). These sensors are connected to the computer of the ECU 200. The ECU 200 controls the action of the rear wheel-side shock absorbers 32Rr on the basis of signals from these switches and sensors. The ROM of the computer of the ECU 200 has stored therein, for instance, a program and various data items pertaining to control of the rear wheel-side shock absorbers 32Rr.

Control of the Shock Absorbers

Figure 6:
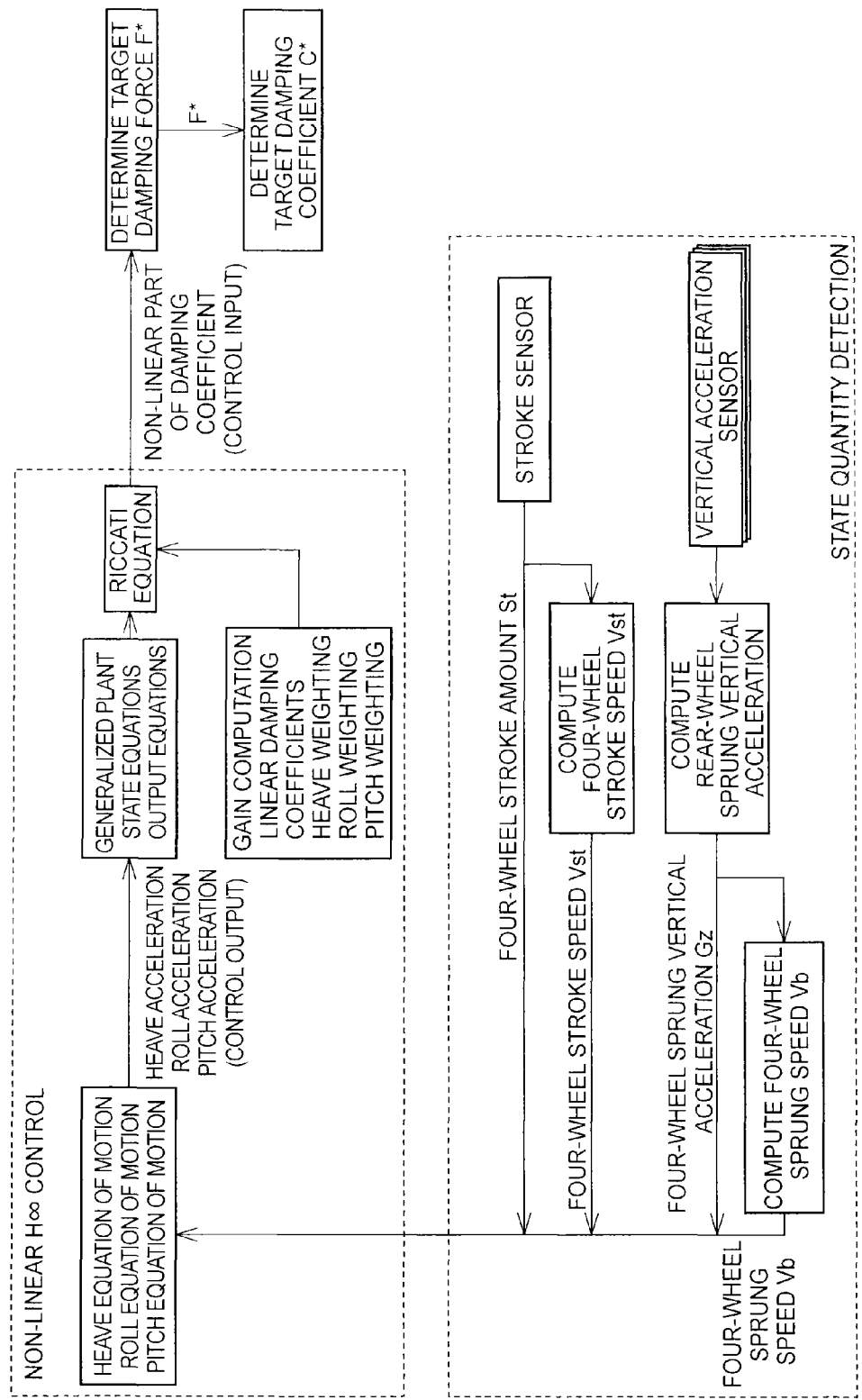
FIG. 6 is a control block diagram of normal control based on non-linear H∞ control theory and that is executed by an electronic control unit (ECU), as a control device, depicted in FIG. 1.

The control scheme normally executed in the vehicle 10 obeys a control law that is based on non-linear H∞ control theory (for instance, non-linear H∞ control theory disclosed in Japanese Patent No. 3787038). The above non-linear H∞ control theory is already a conventional theory, and will be considered to have been conveniently explained. FIG. 6 illustrates a block diagram of normal control based on that non-linear H∞ control theory. In normal control, firstly, a respective stroke amount St of each of the four shock absorbers 32 is acquired from the respective four stroke sensors 226, and a respective stroke speed Vst of each of the four shock absorbers 32 is computed on the basis of the detected strokes St, as illustrated in FIG. 6. The three sprung vertical accelerations detected by the three vertical acceleration sensors 224 are converted to respective sprung vertical accelerations Gz of the sprung sections corresponding to each of the four wheels 12. A sprung absolute speed Vb of the sprung section corresponding to each of the four wheels 12 is computed on the basis of the converted sprung vertical acceleration Gz corresponding to of each of the four wheels 12.

The control law based on non-linear H∞ control theory and that is used for control at normal times is stored in the computer of the ECU 200. In this control law, briefly, the vibration generated in the vehicle body is divided into respective vibration components, namely heave vibration, being vibration of the position of the center of gravity of the vehicle body in the top-bottom direction, roll vibration, being rotational vibration about the axis of the front-rear direction that passes through the center of gravity of the vehicle body, and pitch vibration, being rotational vibration about the axis of the left-right direction that passes through the center of gravity of the vehicle body, and the foregoing vibration components are damped by the four shock absorbers 32 concertedly. The stroke amounts St and stroke speeds Vst corresponding to each of the four shock absorbers 32 and the sprung vertical accelerations Gz and sprung absolute speeds Vb corresponding to each of the four wheels 12 are inputted, and target damping forces F*, being the damping forces to be generated by the respective four shock absorbers 32, are computed in accordance with the above control law based on non-linear H∞ control theory.

In the vehicle 10 only the rear wheel-side shock absorbers 32Rr allow for modification of the damping force with respect to the stroke speed. Each of the rear wheel-side shock absorbers 32Rr is controlled on the basis of the target damping force F* that corresponds to the respective rear wheel-side shock absorber 32Rr, from among the target damping forces F* computed as described above. Specifically, the ECU 200 performs control that involves determining respective target damping coefficients C* by dividing the target damping forces F*, corresponding to each of the rear wheel-side shock absorbers 32Rr, by the stroke speeds Vst corresponding to the target damping forces F*, to control thus the damping coefficient modification mechanism 110 of each of the rear wheel-side shock absorbers 32Rr, and that involves controlling the motor 120 of the damping coefficient modification mechanism 110, to achieve the respective target damping coefficient C*. That is, the vehicle 10 is configured so that control to be executed on the four shock absorbers that are provided corresponding to the four wheels is performed only on the rear wheel-side shock absorbers 32Rr that have the damping coefficient modification mechanism 110.

The control law based on non-linear H∞ control theory will be explained next. In non-linear H∞ control theory, a generalized plant is firstly assumed to be a control model having four input and outputs, namely a control input, a disturbance input, a control input and a control output. The postulated generalized plant of the vehicle 10 relies on an equation of motion pertaining to the motion of the position of the center of gravity of the vehicle body in the top-bottom direction, an equation of motion pertaining to the rotational motion about the axis of the front-rear direction that passes through the center of gravity of the vehicle body, and an equation of motion pertaining to rotational motion about the axis of the left-right direction that passes through the center of gravity of the vehicle body. The equations of motion denote respectively the relationship between the acceleration of the position of the center of gravity of the vehicle body in the top-bottom direction (heave acceleration), the angular acceleration about the axis of the front-rear direction that passes through the center of gravity of the vehicle body (roll angular acceleration), the angular acceleration about the axis of the left-right direction that passes through the center of gravity of the vehicle body (pitch angular acceleration), as well as the stroke amounts St, stroke speeds Vst, sprung vertical accelerations Gz and sprung absolute speeds Vb obtained as described above. The equations of motion obey a state space representation, from which state equations and output equations are derived. Herein, the stroke amounts St, the stroke speeds Vst, the sprung vertical accelerations Gz and the sprung absolute speeds Vb are used as state quantities, and the heave acceleration, roll angular acceleration and pitch angular acceleration are selected as the control output (measurement output). The products resulting from multiplying the heave acceleration, the roll angular acceleration, the pitch angular acceleration by a weighting function (7.0 Hz low-pass filter), being a frequency weighting, are selected as evaluation outputs, and the control input (non-linear part of the respective damping coefficient) is also multiplied by a weighting function, to define the generalized plant. Next, a solution that satisfies the Riccati equation is computed, and the non-linear part of the damping coefficient, being the control input, is computed on the basis of the computed solution. In the computation of the non-linear part of the damping coefficient, there are set respective gains (weightings) corresponding to each of the heave vibration, roll vibration and pitch vibration, and the gains are used in order to determine which damping from among those of heave vibration, roll vibration and pitch vibration, is to be prioritized.

Put simply, the heave acceleration, the roll angular acceleration and the pitch angular acceleration, which are the control output, are computed on the basis of the stroke amounts St, the stroke speeds Vst, the sprung vertical accelerations Gz and the sprung absolute speeds Vb, being state quantities, and the non-linear part of the damping coefficient being the control input is computed in such a manner that the heave acceleration, the roll angular acceleration and the pitch angular acceleration become zero. The respective target damping force F* is computed on the basis of the non-linear part of the computed damping coefficient.

Characterizing Features of the Vehicle

Figure 7:
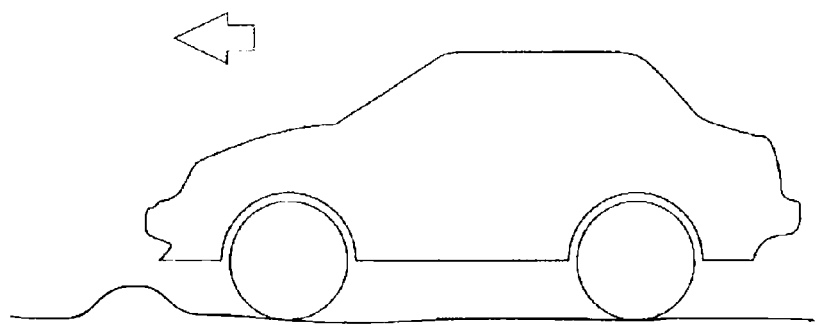
FIG. 7 is a schematic diagram illustrating a process where front wheels and rear wheels pass sequentially over a bump on a road surface, as an example of an instance where pitch vibration is generated.

Vibration is found to occur in the vehicle when the two front wheels and the two rear wheels sequentially pass over a bump on the road surface, as illustrated in FIG. 7. In this case, the front wheel-side sprung section and the rear wheel-side sprung section undergo damping vibration of a frequency (damped vibration frequency $\omega_d$) that is given by the expression below.

$$\omega_d = (1-\zeta^2)^{1/2} \cdot \omega \text{(for a case where damping ratio } \zeta<1\text{)}$$

Figure 8:
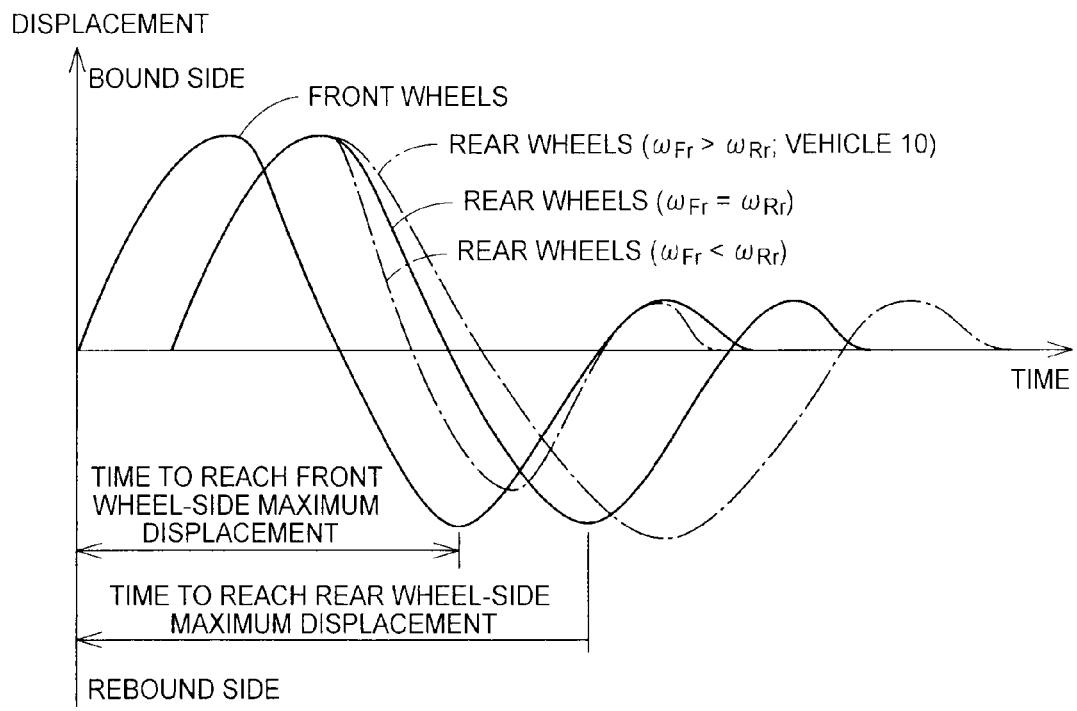
FIG. 8 is a diagram illustrating fluctuations of a front wheel-side sprung section and a rear wheel-side sprung section when front wheels and rear wheels pass sequentially over a bump on a road surface.

Herein, damping ratio is $\zeta=C/C_C$, and a critical damping coefficient is $C_C=2\cdot(m\cdot k)^{1/2}$, for the damping coefficient C of the shock absorber. In an ordinary vehicle, vibration upon passage of the wheel over a bump or pothole on the road surface is set so as to converge in a little over one period. If the front wheel-side damped vibration frequency and the rear wheel-side damped vibration frequency are substantially identical, then the displacement of the front wheel-side and the rear wheel-side sprung sections reach a maximum value in this order, and vibration converges in that order, as illustrated in FIG. 8. In an ordinary vehicle, the rear wheel-side sprung resonance frequency $\omega_{Rr}$ is set higher than the front wheel-side resonance frequency $\omega_{Fr}$. In an ordinary vehicle, specifically, pitch vibration in the vehicle body does not easily occur due to matching of the timings at which the displacement of the front wheel-side vibration and the rear wheel-side vibration in the rebound direction become maximal.

Figure 9:
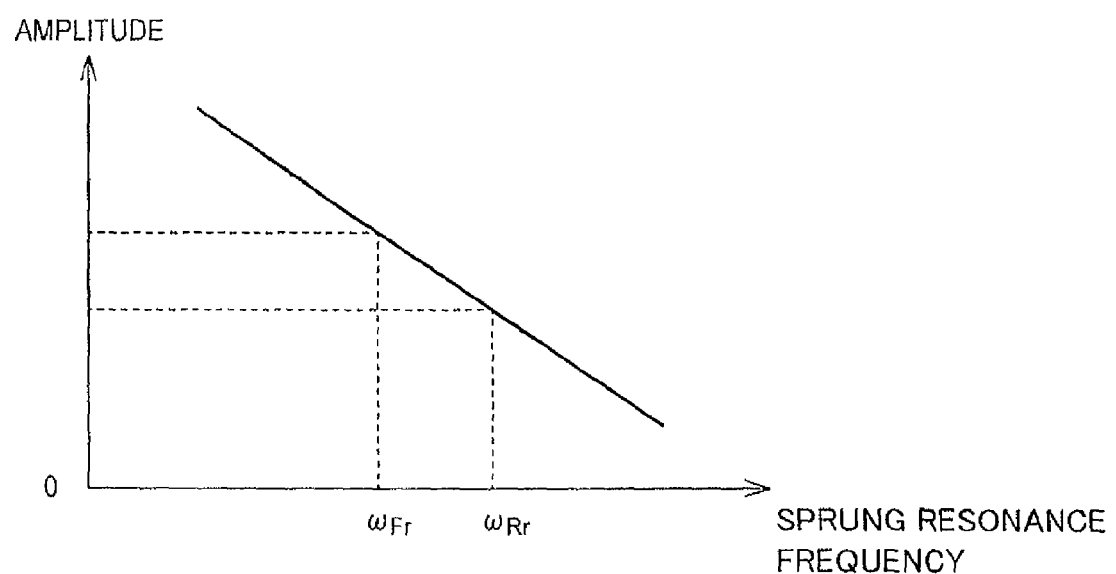
FIG. 9 is a diagram illustrating the relationship between sprung resonance frequency and the amplitude of the behavior of a vehicle body.

In the vehicle 10, by contrast, the rear wheel-side sprung resonance frequency $\omega_{Rr}$ is set lower than the front wheel-side resonance frequency $\omega_{Fr}$, as described above. In the vehicle 10, specifically, pitching of the vehicle body readily occurs in a case where the vehicle 10 drives over bumps on the road surface in a state where the damping coefficients of the rear wheel-side shock absorbers 32Rr are fixed to a damping coefficient that serves as a reference, without controlling the rear wheel-side shock absorbers 32Rr, since the timings at which the displacements of the front wheel-side vibration and the rear wheel-side vibration in the rebound direction become maximal are offset with respect to each other. As illustrated in FIG. 9, the behavior of the vehicle body tends to become more pronounced as the sprung resonance frequency becomes lower. In the vehicle 10, the behavior of the front wheel-side sprung section is comparatively less pronounced, whereas the behavior of the rear wheel-side sprung section is comparatively more pronounced. In the vehicle 10, only the rear wheel-side shock absorbers 32Rr have the damping coefficient modification mechanism 110, and only the rear wheel-side shock absorbers 32Rr are controlled. Thereby, the behavior of the entire vehicle body can be effectively curbed by controlling the damping force exerted on the comparatively large movement of the rear wheel-side sprung section. In the vehicle 10 there is used control to be executed in a vehicle that is provided with four shock absorbers corresponding to each of the four wheels and such that the damping coefficients of the shock absorbers can be modified. An effect is thus elicited whereby the behavior of the vehicle body is suppressed without newly constructing a dedicated control system for the vehicle 10.

In the vehicle 10, the rear wheel-side sprung resonance frequency $\omega_{Rr}$ is set lower than the front wheel-side resonance frequency $\omega_{Fr}$, and only the shock absorbers 32Rr corresponding to the two rear wheels 12Rr, being the wheels with lowered sprung resonance frequency from among the two front wheels 12Fr and the two rear wheels 12Rr, can have the damping coefficient thereof modified. However, the shock absorbers the damping coefficient whereof can be modified may just be provided so as to correspond to the two wheels of lower sprung resonance frequency, from among the front wheels 12Fr and the rear wheels 12Rr. That is, shock absorbers the damping coefficients whereof can be modified may be provided so as to correspond to respective front wheels 12Fr, in an ordinary vehicle where the rear wheel-side sprung resonance frequency $\omega_{Rr}$ is set higher than the front wheel-side resonance frequency $\omega_{Fr}$. However, many vehicles have the engine disposed on the front side. In such vehicles, the weight of the front wheel-side sprung section is little affected by occupants or by cargo load, and does not fluctuate too much. The weight of the rear wheel-side sprung section, by contrast, fluctuates significantly depending on the occupants and cargo load. In the vehicle 10 of the embodiment, the rear wheels 12Rr are provided with shock absorbers the damping coefficient whereof can be modified, even upon fluctuation of the weight of the rear wheel-side sprung section. Accordingly, the vehicle body behavior can be curbed more effectively, even upon fluctuation of the weight of the rear wheel-side sprung section, than in a vehicle having a configuration wherein shock absorbers the damping coefficient whereof can be modified are provided corresponding to the front wheels 12Fr. In the vehicle 10, therefore, it becomes possible to enhance both steering stability and ride quality, which are mutually exclusive, in, a comparatively inexpensive manner, since shock absorbers the damping coefficient whereof can be modified are not provided in all the wheels.

Embodiment 2

In the vehicle of the second embodiment, as in the case of the vehicle 10 of the first embodiment, the rear wheel-side sprung resonance frequency $\omega_{Rr}$ is set lower than the front wheel-side resonance frequency $\omega_{Fr}$, and only shock absorbers corresponding to the rear wheels 12Rr are set to have a modifiable damping coefficient. In the vehicle of the second embodiment, however, shock absorbers 250 that are provided corresponding to the rear wheels 12Rr are not of hydraulic-type, but are electromagnetic-type shock absorbers, having each an electromagnetic motor 252, that generate approach and separation forces, being forces that rely on forces generated by the electromagnetic motor 252 and that are exerted on the sprung section and the unsprung section corresponding to the shock absorbers 250, for drawing the sprung section and the unsprung section closer to or apart from each other. Except for the structure of the rear wheel-side shock absorbers and the control scheme thereof, the vehicle of the embodiment is identical to the vehicle 10 of the first embodiment. Accordingly, constituent elements identical to those of the vehicle 10 of the first embodiment will be identified as corresponding elements through the use of identical reference symbols, and an explanation of the elements will be omitted or simplified.

Structure of the Rear Wheel-Side Shock Absorbers

Figure 10:
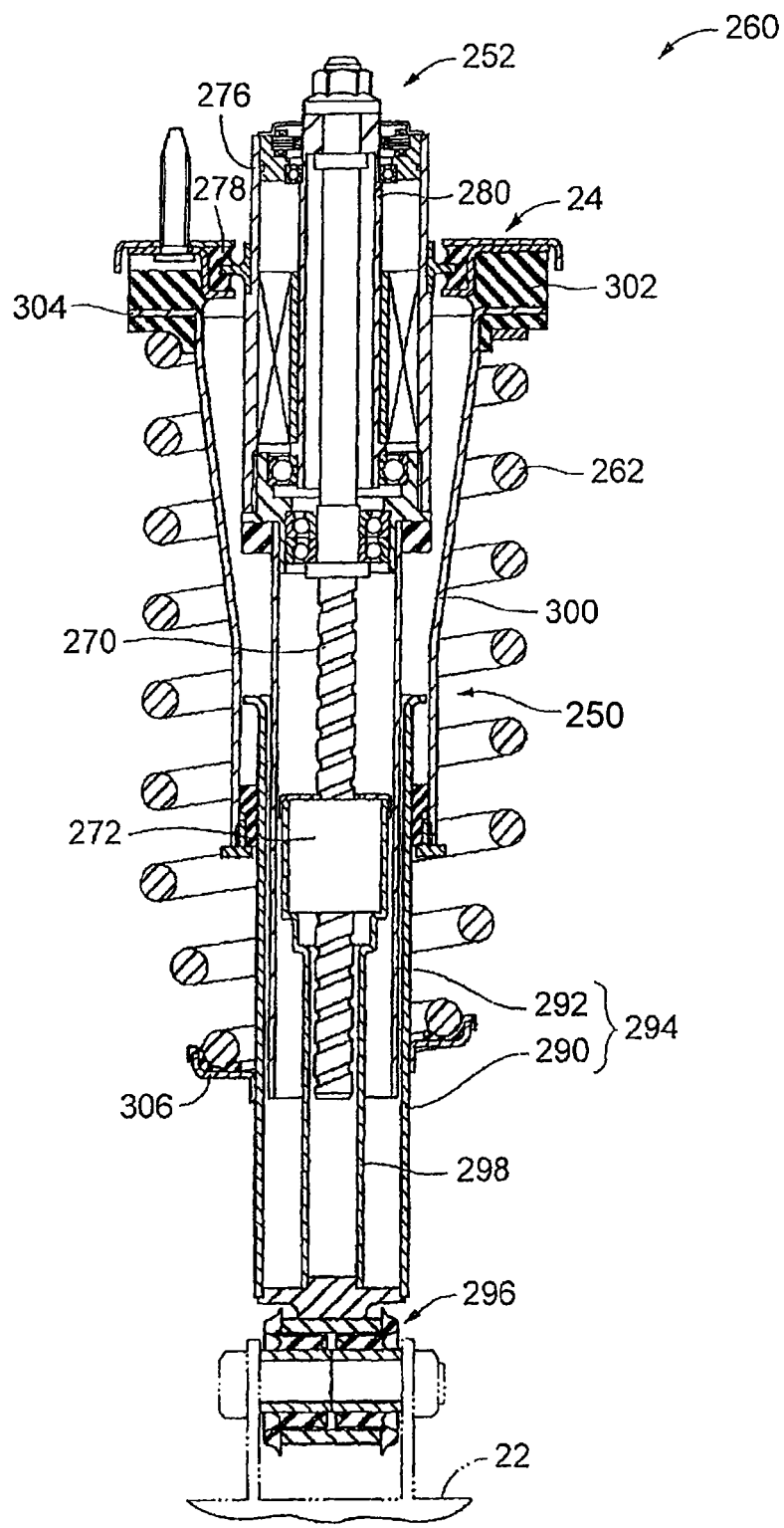
FIG. 10 is a front-view cross-sectional diagram illustrating a suspension device corresponding to rear wheels in a vehicle being a second embodiment of the claimable invention.

FIG. 10 illustrates a cross-sectional diagram of a suspension device 260 corresponding to the rear wheels 12Rr. The suspension device 260 corresponding to the rear wheels 12Rr is configured by including the electromagnetic-type shock absorber 250 and a coil spring 262 as a suspension spring. The foregoing are integrated together.

The shock absorber 250 is provided with: a ball screw mechanism, configured by including a threaded rod 270, as a male thread section having a thread groove formed thereon, and a nut 272, as a female thread section that holds a bearing ball and that is screwed with the threaded rod 270; the electromagnetic motor 252 (hereafter also referred to simply as "motor 252") as a motive power source; and a casing 276 that accommodates the motor 252. The casing 276 holds rotatably the threaded rod 270, and is connected to the mount section 24, via a vibration-proof rubber 278, at the outer peripheral section of the casing 276. The motor 252 has a hollow motor shaft 280, such that the threaded rod 270 is fixed, at the upper end section thereof, to the motor shaft 280, by running through the inner side of the latter. Specifically, the motor 252 imparts torque to the threaded rod 270.

The shock absorber 250 has a cylinder 294 configured by including an outer tube 290 and an inner tube 292 that is fitted into the outer tube 290 and that protrudes above the upper end section of the outer tube 290. The outer tube 290 is connected to the lower arm 22 via a mounting bush 296 that is provided at the lower end section of the outer tube 290. The upper end section of the inner tube 292 is fixed to the casing 276, in a state where the threaded rod 270 is inserted through the inner tube 292. A nut support tube 298 is erected on the inner bottom section of the inner tube 292, such that the nut 272 is fixed, in a state where the latter is screwed to the threaded rod 270, to the inner-side upper end section of the nut support tube 298.

The shock absorber 250 further has a cover tube 300, such that the upper end section of the cover tube 300 is connected to the lower face side of the mount section 24, via a vibration-proof rubber 302, in a state where the cylinder 294 is inserted through the cover tube 300. A flange 304 (functioning as an upper retainer) is formed at the upper end section of the cover tube 300. The coil spring 262, as a suspension spring, is supported in a state of being pinched by the flange 304 and a ring-like lower retainer 306 that is provided on the outer peripheral face of the outer tube 290.

When the sprung section and the unsprung section are brought closer to or apart from each other, the threaded rod 270 and the nut 272 of the shock absorber 250 can move relatively in the axial direction by virtue of the above-described structure, so that the threaded rod 270 is caused to rotate with respect to the nut 272 as a result of that relative motion. The motor shaft 280 as well rotates as a result. The motor 252 is set to be capable of imparting rotation torque to the threaded rod 270, such that, on account of that rotation torque, a resistance force can be generated that is exerted against the relative rotation of the threaded rod 270 and the nut 272, in a direction of hindering that relative rotation. This resistance force can be used as a damping force exerted on the approach and separation movement of the sprung section and the unsprung section. The shock absorber 250 is set to be capable of generating a propulsive force exerted on the relative movement of the sprung section and the unsprung section. The damping force is expressed as the product of the damping coefficient and the stroke speed. The damping coefficient of the rear wheel-side shock absorber 250 can be arbitrarily modified, and hence it is deemed that the damping coefficient can be modified to an arbitrary damping coefficient, for a given stroke speed. That is, the rear wheel-side shock absorber 250 has a damping coefficient modification mechanism.

Control of the Shock Absorber

In the vehicle of the embodiment, there are executed, in parallel, control for causing the vibration of the vehicle body to be damped by the four shock absorbers concertedly (hereafter also referred to as "vehicle body vibration damping control"), control for suppressing rolling of the vehicle body caused by turning of the vehicle (hereafter also referred to as "turning roll suppression control"), and control for suppressing pitching of the vehicle body caused by acceleration and deceleration of the vehicle (hereafter also referred to as "acceleration and deceleration pitch suppression control"). For each of the respective four shock absorbers, specifically, a respective target approach and separation force F*, being a control target value, is determined by totaling the components of the approach and separation force for each of the vehicle body vibration damping control, turning roll suppression control and acceleration and deceleration pitch suppression control, and a rotation angle θ of each motor 252 of each of the two shock absorbers 250 is controlled in such a manner that the shock absorbers 250 corresponding to the two rear wheels 12Rr generate the target approach and separation force F*. An explanation follows next on the method for determining the components of the approach and separation force that is to be generated, in each of the control instances above.

a) Vehicle Body Vibration Damping Control

In vehicle body vibration damping control, firstly, respective movement speeds of the vehicle body for the heave vibration, roll vibration and pitch vibration, namely heave speed $V_h$, roll speed $V_r$, and pitch speed $V_p$, are estimated on the basis of the sprung absolute speed Vb ($V_{FR}$, $V_{FL}$, $V_{RR}$, $V_{RL}$) corresponding to each of the four wheels 12. Specifically, the foregoing are computed in accordance with the expressions below, with respect to the distance of each of the four wheels 12 from the position of the center of gravity.

$$V_h(V_{FR}+V_{FL}+V_{RR}+V_{RL})/4$$

$$V_r=(V_{FR}-V_{FL}+V_{RR}-V_{RL})/4$$

$$V_p=(V_{FR}+V_{FL}-V_{RR}-V_{RL})/4$$

In the above expressions, the distances from the position of the center of gravity of the vehicle body up to the four wheels 12 are identical, and are taken as a unit distance. Next, a heave vibration damping force $F_{Vh}$, a roll vibration damping force $F_{Vr}$ and a pitch vibration damping force $F_{Vp}$ that are to be generated in the vehicle body, for heave vibration, roll vibration and pitch vibration, respectively, are determined in accordance with the expressions below.

$$F_{Vh}=C_h \cdot V_h$$

$$F_{Vr}=C_r \cdot V_r$$

$$F_{Vp}=C_p \cdot V_p$$

Herein, $C_h$, $C_r$ and $C_p$ are damping coefficients for heave vibration, roll vibration and pitch vibration, respectively.

The heave vibration damping force $F_{Vh}$, roll vibration damping force $F_{Vr}$ and pitch vibration damping force $F_{Vp}$ thus determined are distributed to the respective shock absorbers corresponding to the four wheels 12, and the vehicle body vibration damping components $F_V$ for the shock absorbers corresponding to the four wheels 12 are determined on the basis of the sum of the foregoing forces. Specifically, the respective vehicle body vibration damping force components $F_V$ ($F_{VFR}$, $F_{VFL}$, $F_{VRR}$, $F_{VRL}$) for the shock absorbers corresponding to the four wheels 12 are determined in accordance with the expressions below.

$$F_{VFR}=(F_{Vh}+F_{Vr}+F_{Vp})/4$$

$$F_{VFL}=(F_{Vh}-F_{Vr}+F_{Vp})/4$$

$$F_{VRR}=(F_{Vh}+F_{Vr}-F_{Vp})/4$$

$$F_{VRL}=(F_{Vh}-F_{Vr}-F_{Vp})/4$$

b) Turning Roll Suppression Control

In turning roll suppression control, an approach and separation force in the bound direction is generated, as a roll suppressing force, on the shock absorber on the turning inner wheel side, and an approach and separation force in the rebound direction is generated, as a roll suppressing force, on the shock absorber on the turning outer wheel side. More specifically, a control lateral acceleration Gy*, being the lateral acceleration that is used for control, is determined, in accordance with the expression below, on the basis of an estimated lateral acceleration Gyc that is estimated on the basis of the vehicle speed v and the steering angle δ of the steering wheel, and on the basis of an actual lateral acceleration Gyr that is measured by a lateral acceleration sensor 222, as lateral accelerations that are an indicator of the roll moment received by the vehicle body.

$$Gy^* = K_1 \cdot Gyc + K_2 \cdot Gyr (K_1, K_2: \text{gain})$$

The roll suppressing force component $F_R$ is determined, in accordance with the expression below, on the basis of the control lateral acceleration Gy* thus determined.

$$F_R = K_3 \cdot Gy^* (K_3: \text{gain})$$

c) Acceleration and Deceleration Pitch Suppression Control

In acceleration and deceleration pitch suppression control an approach and separation force is generated, as a pitch suppressing force, to suppress fluctuation in the sprung-unsprung distance in a case where nose-diving occurs during deceleration of the vehicle, for instance during braking, or in a case where the vehicle squats during acceleration. Specifically, an actual front-rear acceleration Gx measured by the front-rear acceleration sensor 220 is used as the front-rear acceleration that is an indicator of the pitch moment acting on the vehicle body. The pitch suppressing force component $F_P$ is determined, in accordance with the expression below, on the basis of the actual front-rear acceleration Gx.

$$F_P = K_5 \cdot Gx (K_5: \text{gain})$$

Execution of acceleration and deceleration pitch suppression control is triggered when a degree of opening of a throttle, as detected by a throttle sensor, or a master cylinder pressure, detected by a brake pressure sensor, exceeds a set threshold value.

d) Determination of Control Target Values

The target approach and separation force F* of the shock absorbers corresponding to the two rear wheels 12Rr is determined in accordance with the expression below on the basis of the vehicle body vibration damping force component $F_V$, the roll suppressing force component $F_R$ and the pitch suppressing force component $F_P$ of the approach and separation force, once the foregoing components have been determined as described above.

$$F^* = F_V + F_R + F_P$$

A target motor rotation angle θ* is determined on the basis of the target approach and separation force F*, by virtue of the correspondence relationship between the approach and separation force and the motor rotation angle. The motor 252 is controlled in such a manner that the actual motor rotation angle θ, being the motor rotation angle in actuality, becomes the target motor rotation angle θ*.

Characterizing Features of the Vehicle

In the vehicle of the embodiment, as in the case of the vehicle 10 of the first embodiment, only the shock absorbers 250 corresponding to the two rear wheels 12Rr have a damping coefficient modification mechanism, and only the rear wheel-side shock absorbers 250 are controlled. Thereby, the behavior of the entire vehicle body can be effectively curbed by controlling the force exerted on the comparatively large movement of the rear wheel-side sprung section. In the vehicle there is used control to be executed in a vehicle that is provided with four electromagnetic type shock absorbers corresponding to the four wheels, an effect is thus elicited whereby the behavior of the vehicle body is suppressed without newly constructing a dedicated control system for the vehicle 10. In the vehicle, thus, it becomes possible to enhance both steering stability and ride quality, which are mutually exclusive, in a comparatively inexpensive manner, since electromagnetic-type shock absorbers need not be provided in all the wheels.

10: vehicle; 12FR: right front wheel; 12FL: left front wheel; 12RR: right rear wheel; 12RL: left rear wheel; 20: suspension device; 22: suspension lower arm (unsprung section); 24: mount section (sprung section); 30: coil spring (suspension spring); 32Fr: front wheel-side shock absorber; 32Rr: rear wheel-side shock absorber; 40: housing; 42: piston; 44: piston rod; 100: housing; 102: piston; 104: piston rod; 110: damping coefficient modification mechanism; 120: electromagnetic motor; 150: clearance; 200: suspension ECU (control device); 220: front-rear acceleration sensor [Gx]; 222: lateral acceleration sensor [Gy]; 224: vertical acceleration sensor [Gz]; 226: stroke sensor [St]; 250: shock absorber; 252: electromagnetic motor; 262: coil spring (suspension spring); 270: threaded rod; 272: nut $\omega_{Fr}$: front wheel-side sprung resonance frequency; $\omega_{Rr}$: rear wheel-side sprung resonance frequency; $K_{Fr}$: front wheel-side spring constant; $K_{Rr}$: rear wheel-side spring constant; St: stroke amount; Vst: stroke speed; Gz: sprung vertical acceleration; Vb: sprung absolute speed; F*: target damping force; C*: target damping coefficient.

The invention claimed is:

1. A vehicle, comprising:

four wheels being two front wheels disposed on a front side of the vehicle and two rear wheels disposed on a rear side of the vehicle;

four suspension springs provided corresponding to the four wheels, each of the suspension springs elastically connecting a sprung section and an unsprung section corresponding to each suspension spring; and four shock absorbers provided corresponding to the four wheels, each of the shock absorbers generating a damping force exerted on an approach and separation movement of the sprung section and the unsprung section corresponding to each shock absorber, wherein a spring constant of each of the four suspension springs and a shared load on each of the four wheels are adjusted such that a front wheel-side sprung resonance frequency corresponding to the two front wheels and a rear wheel-side sprung resonance frequency corresponding to the two rear wheels are different from each other; and from among the four shock absorbers, only two shock absorbers that are provided corresponding to two wheels of lowered sprung resonance frequency, from among the two front wheels and the two rear wheels, have respectively damping coefficient modification mechanisms that modify a damping coefficient that serves as a reference of a magnitude of the damping force generated by the two shock absorbers.

2. The vehicle according to claim 1, wherein the spring constant of each of the four suspension springs and the shared load on each of the four wheels are adjusted such that the rear wheel-side sprung resonance frequency is lower than the front wheel-side sprung resonance frequency; and only the two shock absorbers corresponding to the two rear wheels, from among the four shock absorbers, have the damping coefficient modification mechanisms.

3. The vehicle according to claim 1, wherein
each of the two shock absorbers having the damping coefficient modification mechanism, from among the four shock absorbers, is a hydraulic-type shock absorber having:
(A) a housing that is connected to one of the sprung section and the unsprung section, and that accommodates a working fluid;
(B) a piston that divides an interior of the housing into two working fluid chambers, and that can slide through the interior of the housing;
(C) a piston rod that has one end section connected to the piston and the other end section extending out of the housing and being connected to the other one of the sprung section and the unsprung section;
(D) a working fluid circulation allowing mechanism that is provided in the piston, and that allows circulation of the working fluid between the two working fluid chambers, resulting from sliding of the piston, in a state of exerting resistance against the circulation; and
(E) a flow resistance modification mechanism that functions as the damping coefficient modification mechanism, by being configured to modify the damping coefficient through modification of a magnitude of the resistance that the working fluid circulation allowing mechanism exerts against the circulation of the working fluid.

4. The vehicle according to claim 1, wherein
each of the two shock absorbers having the damping coefficient modification mechanism from among the four shock absorbers, is an electromagnetic-type shock absorber that has an electromagnetic motor and that generates an approach and separation force, which is a force that relies on a force generated by the electromagnetic motor and that is exerted, on the sprung section and the unsprung section corresponding to the shock absorber, to draw the sprung section and the unsprung section closer to or apart from each other; and
the damping coefficient modification mechanism is configured such that upon generation of the approach and separation force as the damping force, the damping force is determined by a product of a speed of the approach and separation movement of the sprung section and the unsprung section, and a gain corresponding thereto, and is configured such that the gain can be modified.

5. The vehicle according to claim 3, wherein
each of the two shock absorbers, excluding the two shock absorbers having the damping coefficient modification mechanism, from among the four shock absorbers, is a hydraulic-type shock absorber in which the damping coefficient cannot be modified.

6. The vehicle according to claim 1, further comprising
a control device that controls the damping coefficient modification mechanism of each of two shock absorbers from among the four shock absorbers,
wherein
the control device is configured
to divide vibration generated in a vehicle body into a heave vibration component, a roll vibration component and a pitch vibration component, each of which is one component of the vibration, to determine a target damping force, which is a damping force to be generated by each of the four shock absorbers, in accordance with a control rule such that each of the vibration components is damped by the four shock absorbers concertedly, and
to control the damping coefficient modification mechanism of each of the two shock absorbers so as to perform modification to the damping coefficient according to the corresponding target damping force.

7. The vehicle according to claim 6, wherein
the control device is configured to determine, as the control rule, the target damping force in use of state feedback control having, as a control output, a heave acceleration which is an acceleration of the vehicle body in a top-bottom direction, a roll acceleration which is an angular acceleration of the vehicle body about an axis of a front-rear direction, and a pitch acceleration which is an angular acceleration of the vehicle body about an axis of a left-right direction, so as to curb the heave acceleration, the roll acceleration and the pitch acceleration.

8. The vehicle according to claim 7, wherein the control rule conforms to non-linear H∞ control theory.

9. The vehicle according to claim 7, wherein
the control rule according to which the state feedback control is performed is established on the basis of state equations that are derived on the basis of an equation of motion of the vehicle body in the top-bottom direction, an equation of motion of the vehicle body about the axis of the front-rear direction, and an equation of motion of the vehicle body about the axis of the left-right direction.

10. The vehicle according to claim 7, wherein
the control device is configured to use, as state quantities in the state feedback control, (a) a sprung acceleration which is an acceleration of the sprung section in the top-bottom direction, (b) a sprung speed which is a speed of the sprung section in the top-bottom direction, (c) a relative displacement amount between the sprung section and the unsprung section in an approach and separation direction, and (d) a relative speed between the sprung section and the unsprung section in the approach and separation direction, corresponding to each of the four wheels.

11. The vehicle according to claim 10, further comprising
three vertical acceleration sensors including two sensors that detect a sprung vertical acceleration, which is the acceleration of the sprung section in the top-bottom direction, corresponding to each of the two front wheels, and a sensor that detects the acceleration, in the top-bottom direction, of a portion of the vehicle body positioned between the two rear wheels,
wherein the control device is configured to calculate the sprung acceleration and sprung speed corresponding to each of the two rear wheels on the basis of detection results by the three vertical acceleration sensors.

* * * * *